(12) United States Patent
Baek

(10) Patent No.: US 10,940,914 B1
(45) Date of Patent: Mar. 9, 2021

(54) BICYCLE DRIVING APPARATUS

(71) Applicant: Sung Koo Baek, Seoul (KR)

(72) Inventor: Sung Koo Baek, Seoul (KR)

( * ) Notice: Subject to any disclaimer, the term of this patent is extended or adjusted under 35 U.S.C. 154(b) by 0 days.

(21) Appl. No.: 16/967,290

(22) PCT Filed: Nov. 8, 2019

(86) PCT No.: PCT/KR2019/015128
§ 371 (c)(1),
(2) Date: Aug. 4, 2020

(30) Foreign Application Priority Data

Jul. 29, 2019 (KR) .......................... 10-2019-0091643

(51) Int. Cl.
*B62M 1/30* (2013.01)
*B62M 23/00* (2006.01)
*B62M 1/26* (2013.01)
*B62M 3/06* (2006.01)
*B62M 3/00* (2006.01)
*B62M 1/32* (2013.01)

(52) U.S. Cl.
CPC ............... *B62M 1/30* (2013.01); *B62M 1/26* (2013.01); *B62M 3/06* (2013.01); *B62M 23/00* (2013.01); *B62M 1/32* (2013.01); *B62M 3/003* (2013.01)

(58) Field of Classification Search
CPC . B62M 6/45; B62M 6/40; B62M 1/30; B62M 23/00; B62M 1/26; B62M 1/06; B62M 3/003; B62M 1/32
See application file for complete search history.

(56) References Cited

U.S. PATENT DOCUMENTS

| | | | | |
|---|---|---|---|---|
| 3,873,128 | A * | 3/1975 | Dunder | B62M 11/12 280/236 |
| 6,296,072 | B1 * | 10/2001 | Turner | B62M 11/18 180/220 |
| 2011/0183805 | A1 * | 7/2011 | Chan | B62M 25/08 475/254 |
| 2011/0251008 | A1 * | 10/2011 | Schmitz | B62M 11/145 475/31 |
| 2014/0251708 | A1 * | 9/2014 | Yeh | B62M 6/50 180/206.3 |
| 2014/0339787 | A1 | 11/2014 | Chung | |

(Continued)

FOREIGN PATENT DOCUMENTS

| | | |
|---|---|---|
| JP | 10-009348 A | 1/1998 |
| KR | 20-0424796 Y1 | 8/2006 |
| KR | 10-2034744 B1 | 10/2019 |

OTHER PUBLICATIONS

International Search Report for PCT/KR2019/015128 dated Apr. 24, 2020 (PCT/ISA/210).

(Continued)

*Primary Examiner* — Kevin Hurley
*Assistant Examiner* — Marlon A Arce
(74) *Attorney, Agent, or Firm* — Sughrue Mion, PLLC

(57) ABSTRACT

The present invention relates to a bicycle driving apparatus with a novel structure which allows a bicycle to move forward by alternately pushing each of both pedals in one direction. Since a user repeatedly presses down a left pedal (113) and a right pedal (114) to move a bicycle forward, the bicycle driving apparatus according to the present invention has an advantage of more convenience of use than a conventional bicycle driving apparatus in which the left pedal (113) and the right pedal (114) should rotate.

4 Claims, 9 Drawing Sheets

(56) References Cited

U.S. PATENT DOCUMENTS

| | | | | |
|---|---|---|---|---|
| 2015/0122565 A1* | 5/2015 | Deleval | ............... | B62M 6/50 |
| | | | | 180/206.3 |
| 2016/0016636 A1* | 1/2016 | Thompson | ............... | B62M 6/45 |
| | | | | 74/594.7 |
| 2016/0090151 A1* | 3/2016 | Bendel | ............... | B62M 11/12 |
| | | | | 180/206.3 |
| 2017/0106940 A1* | 4/2017 | Paick | ............... | H01F 7/064 |
| 2017/0203814 A1* | 7/2017 | Kurokawa | ............ | B62K 19/36 |
| 2017/0341708 A1* | 11/2017 | Bernardele | ............ | B62M 9/132 |
| 2018/0244340 A1 | 8/2018 | Schmertz et al. | | |
| 2019/0225300 A1 | 7/2019 | Sprote et al. | | |

OTHER PUBLICATIONS

Korean Grant of Patent for KR 10-2019-0091643 dated Oct. 10, 2019.

* cited by examiner

[FIG. 1]
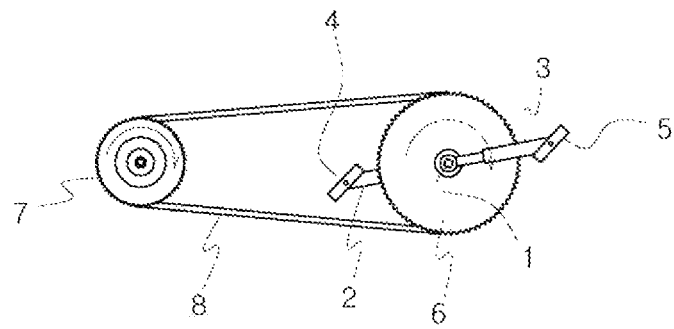
[FIG. 2]
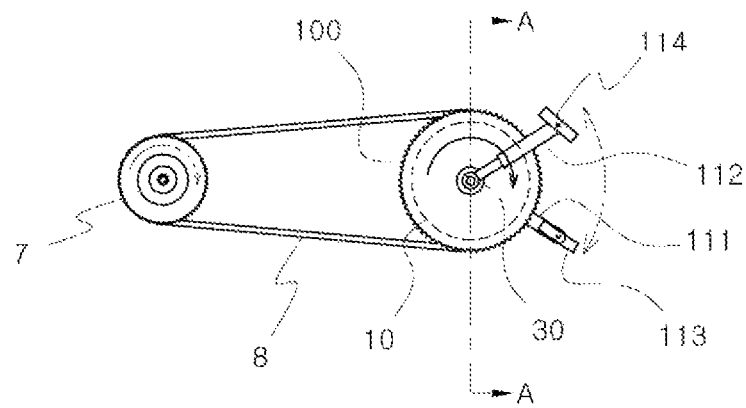

[FIG. 3]
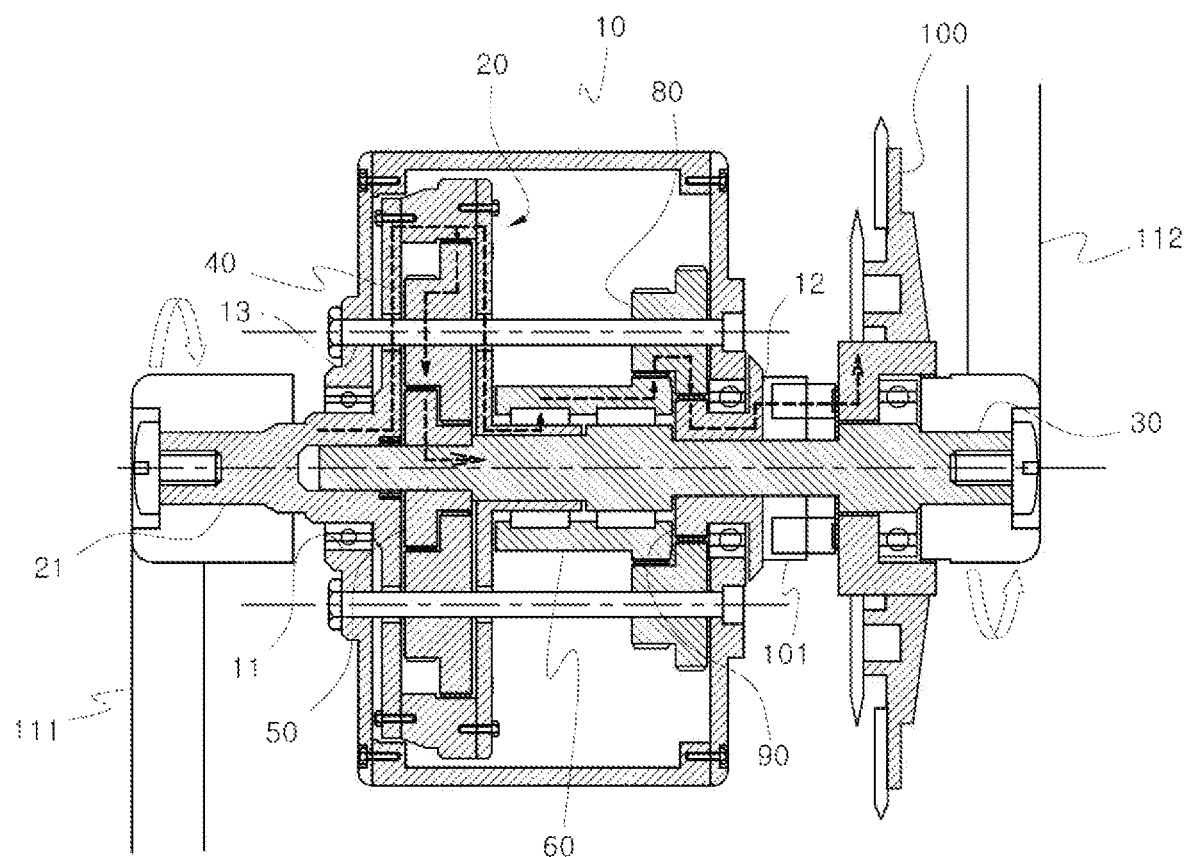

[FIG. 4]
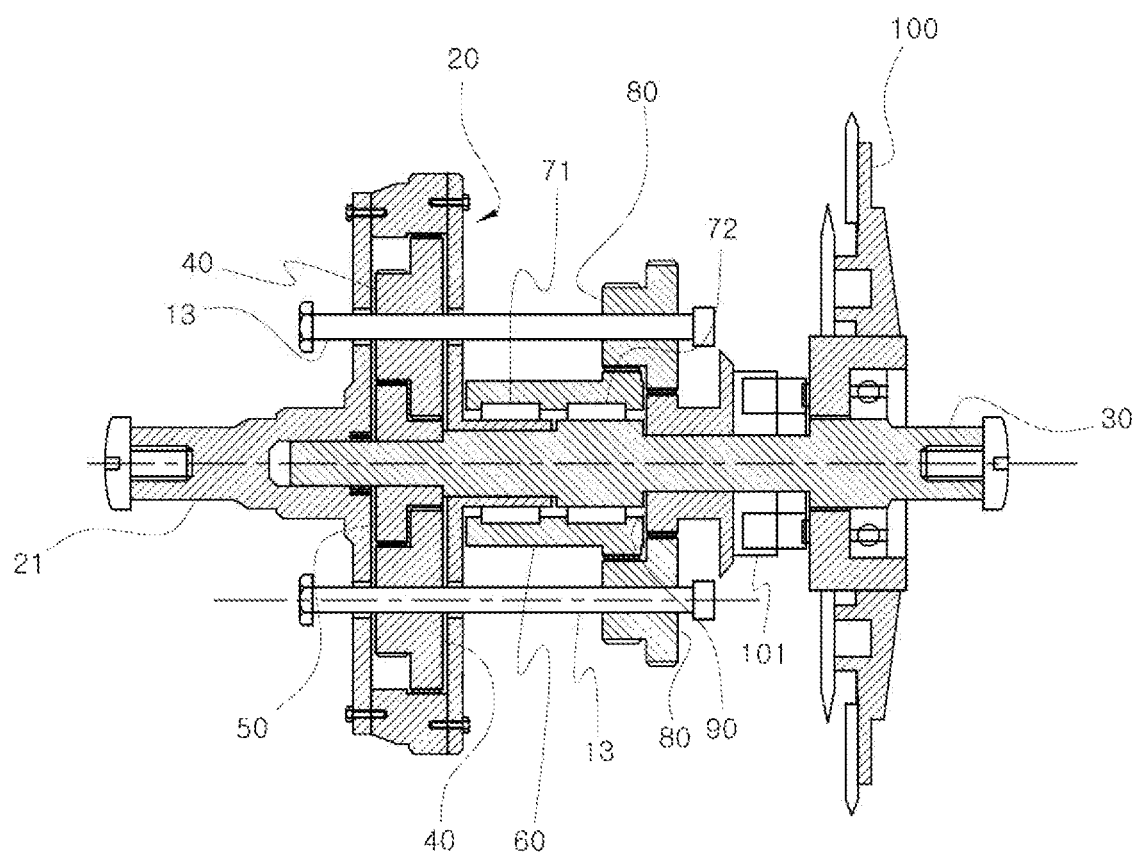

[FIG. 5]
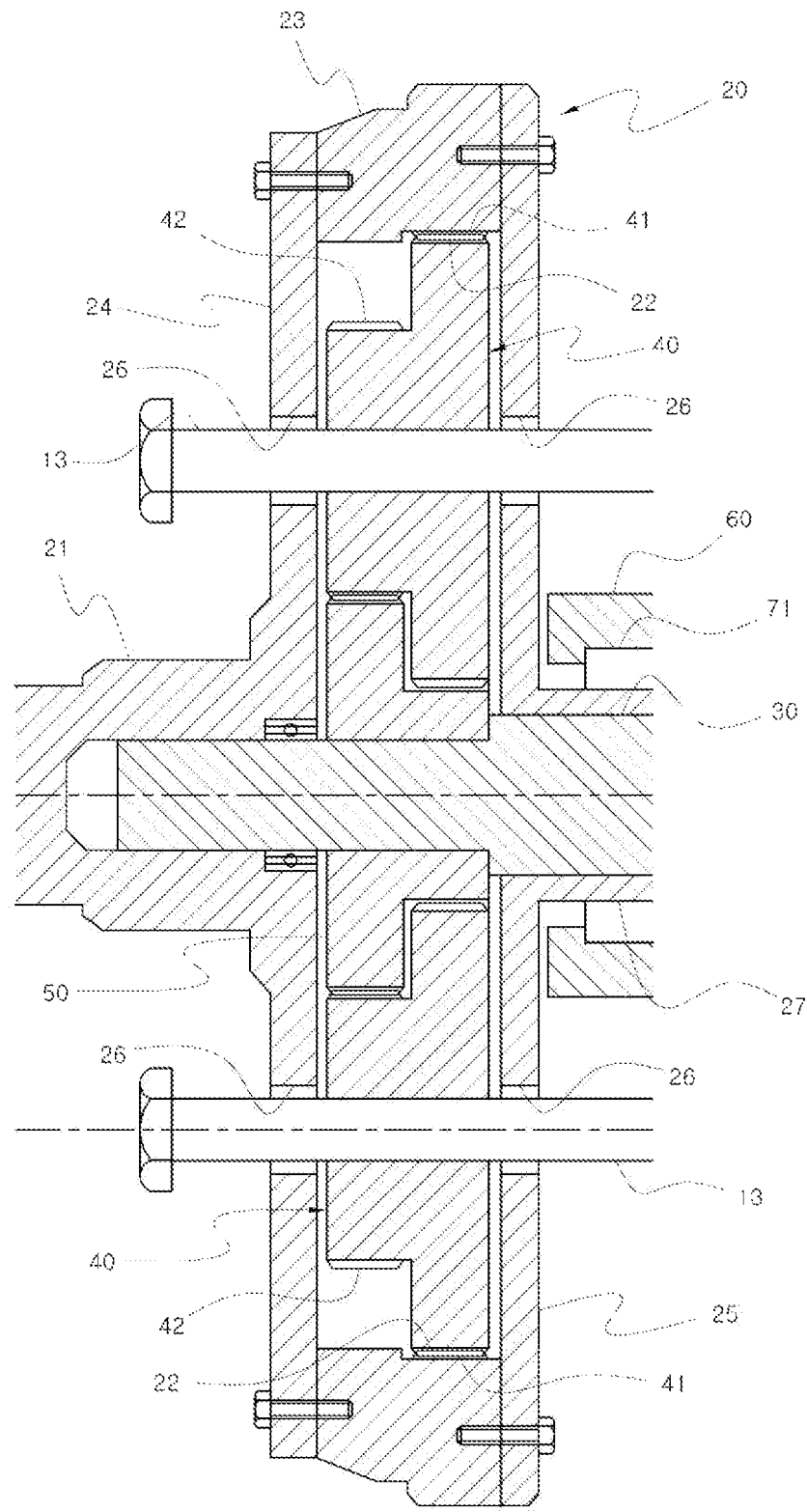

[FIG. 6]
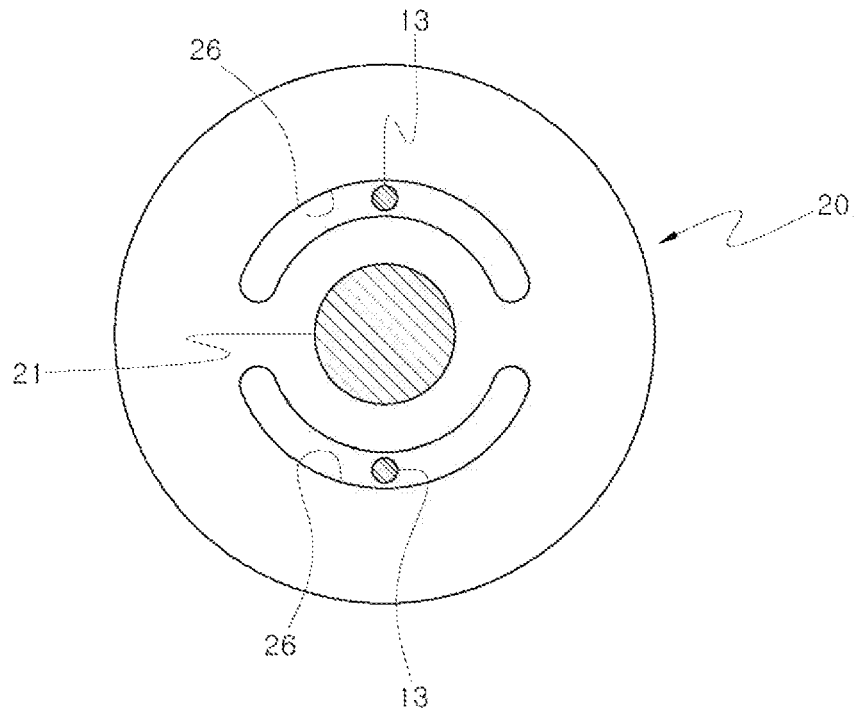
[FIG. 7]
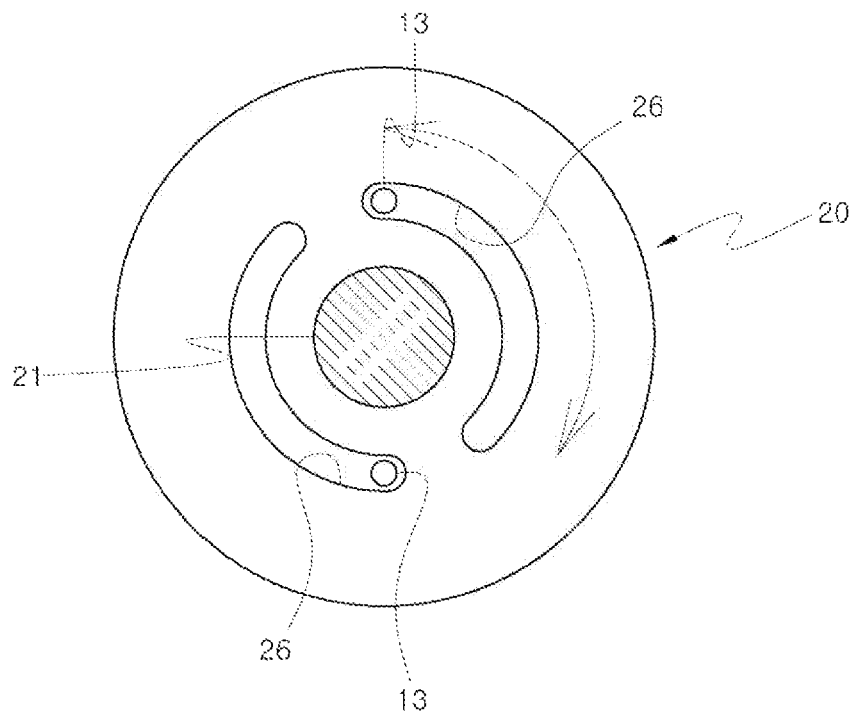

[FIG. 8]
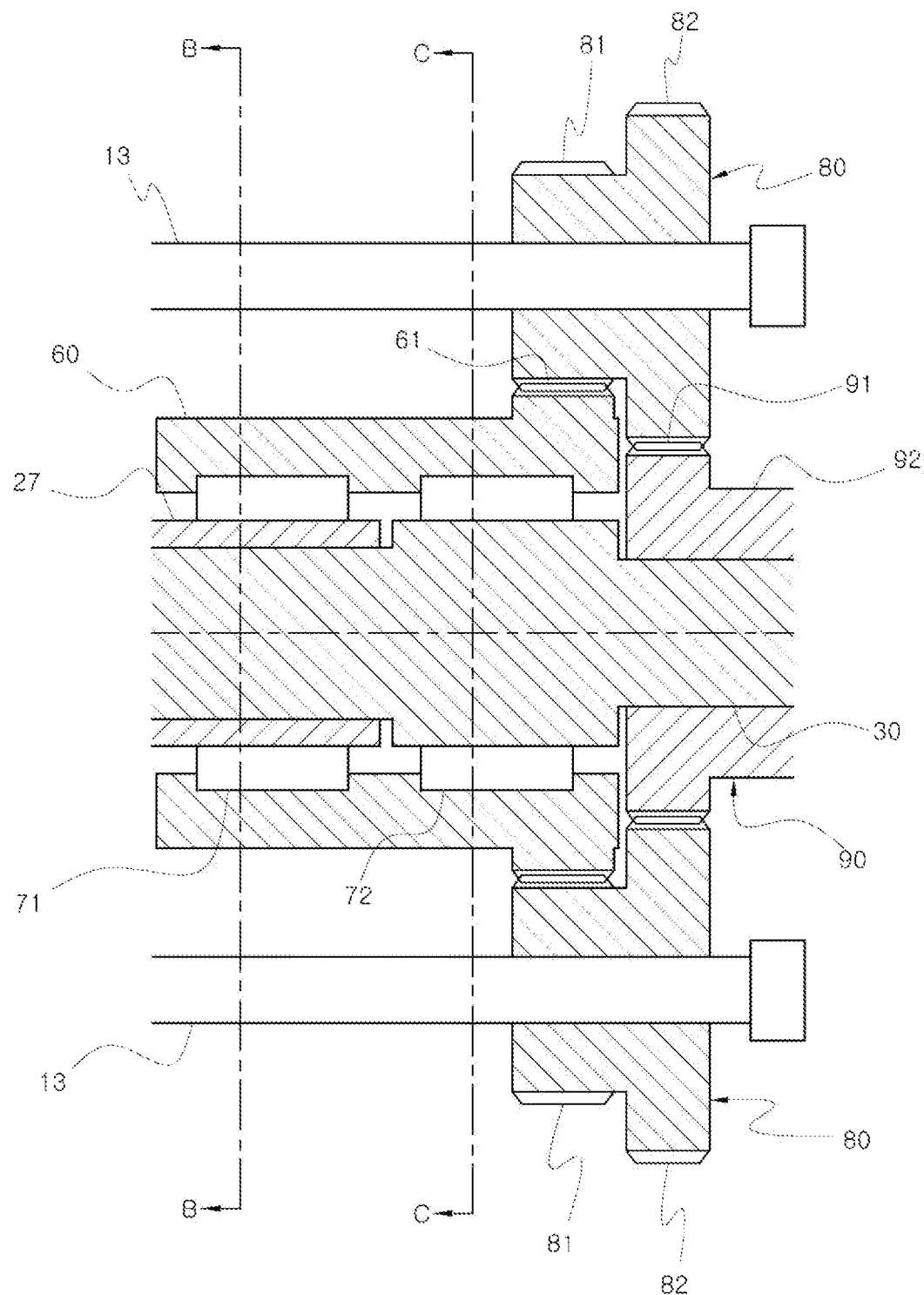

[FIG. 9]
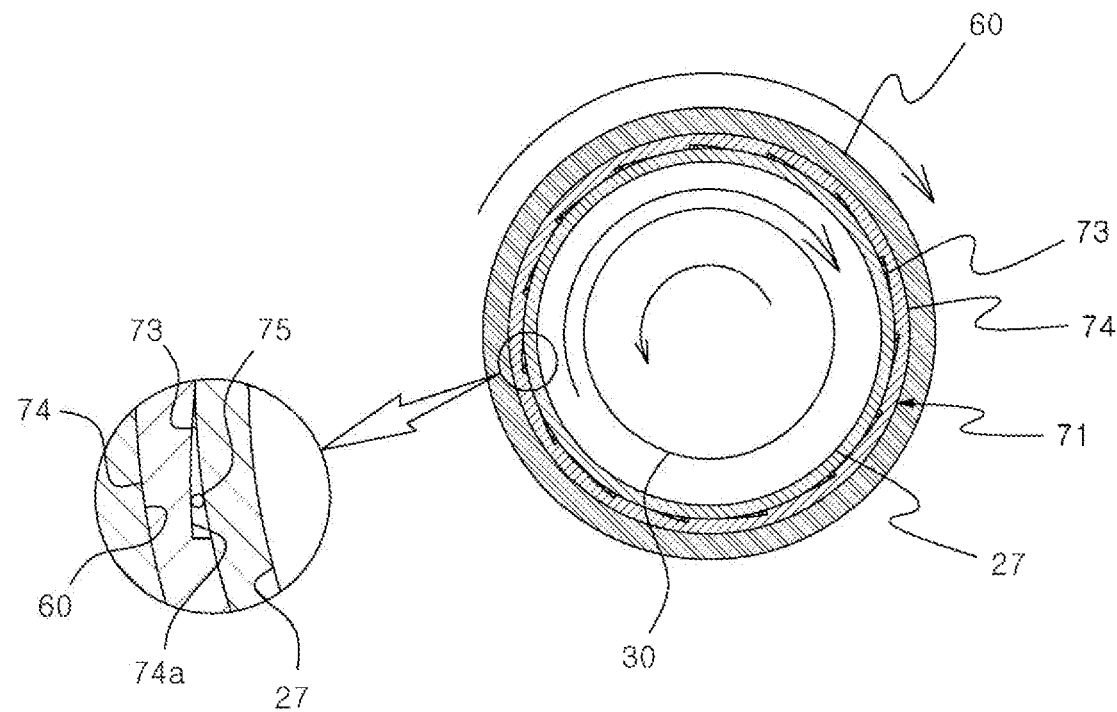
[FIG. 10]
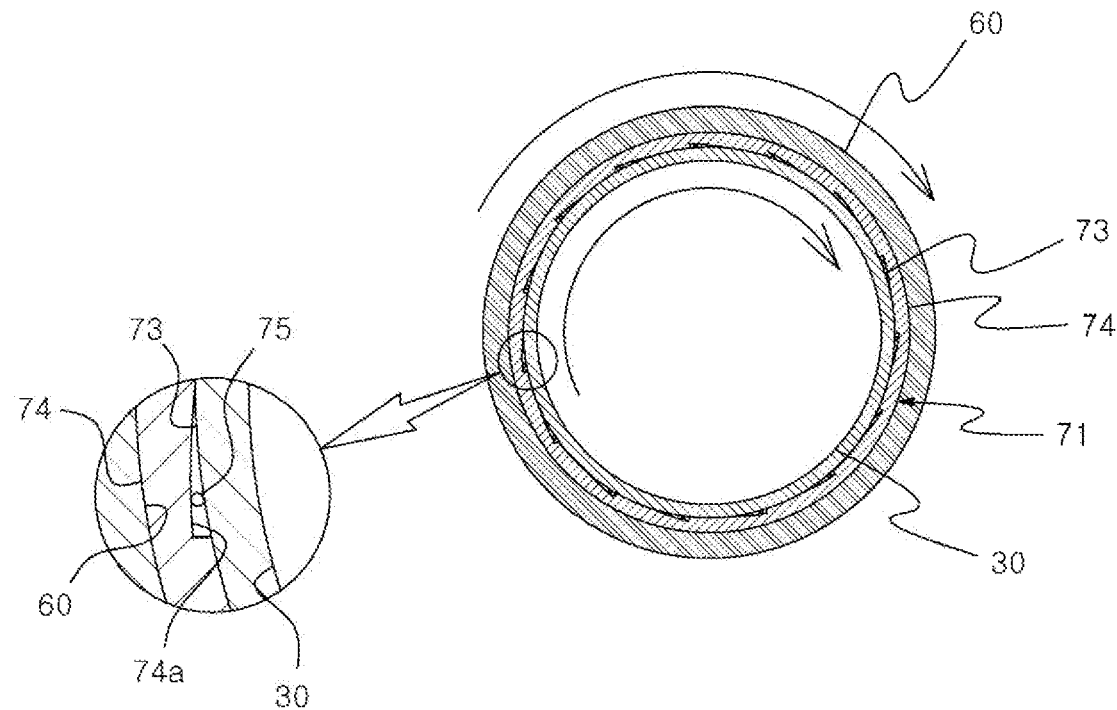

[FIG. 11]
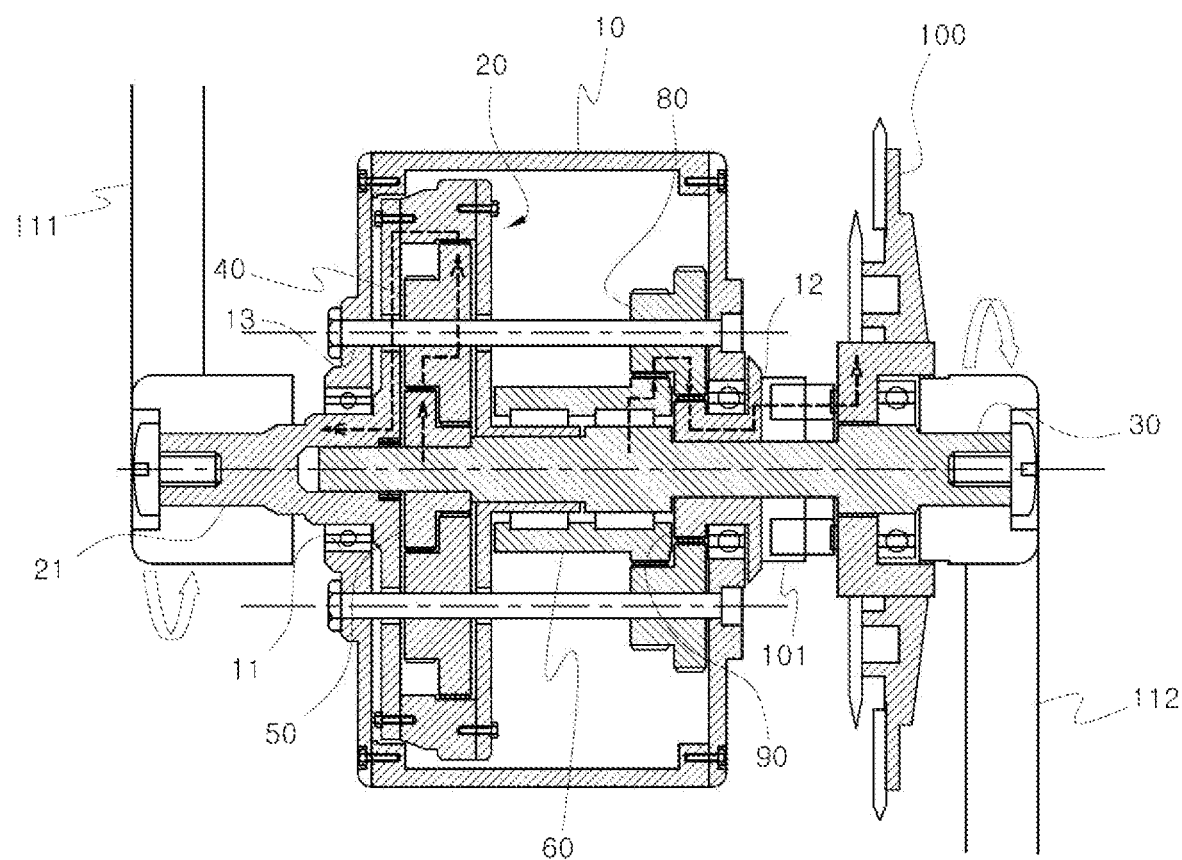

[FIG. 12]
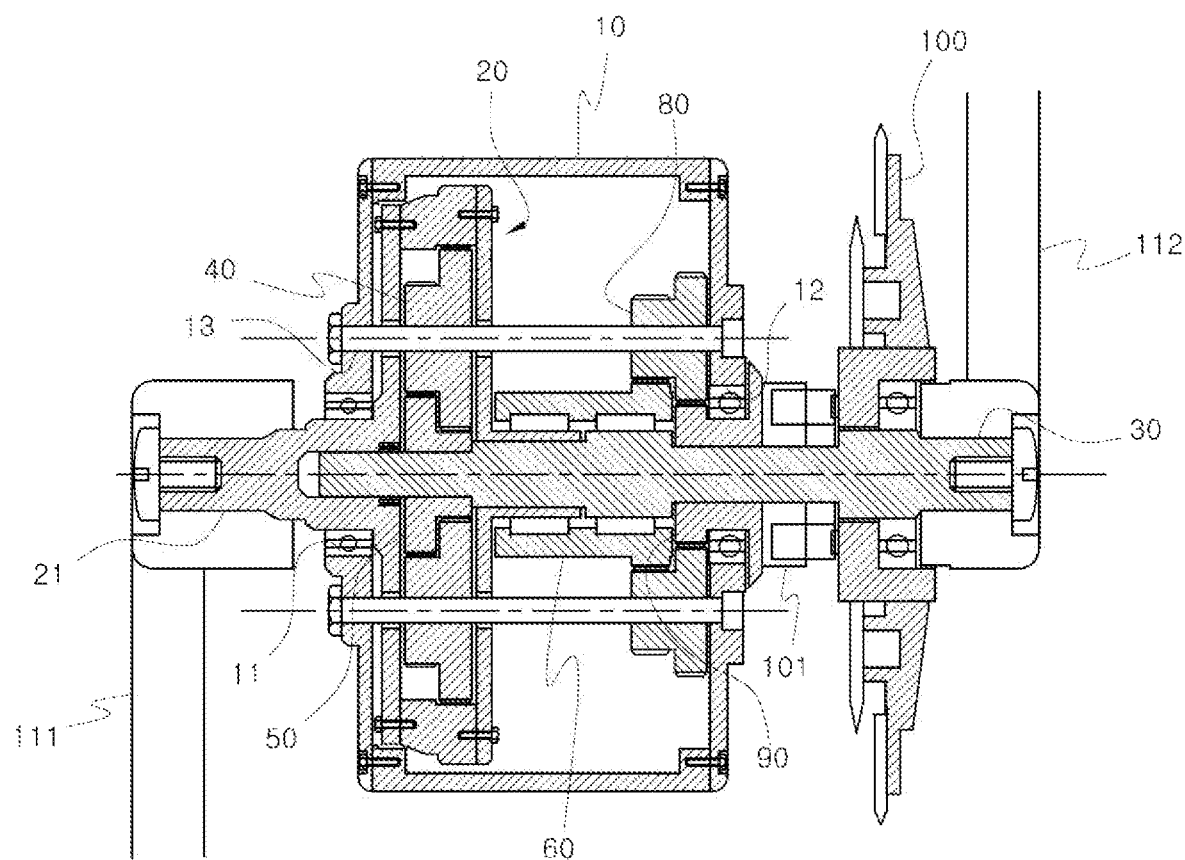

BICYCLE DRIVING APPARATUS

CROSS REFERENCE TO RELATED APPLICATIONS

This application is a National Stage of International Application No. PCT/KR2019/015128 filed Nov. 8, 2019, claiming priority based on Korean Patent Application No. 10-2019-0091643 filed Jul. 29, 2019, the entire disclosures of which are incorporated by reference herein.

TECHNICAL FIELD

The present invention relates to a bicycle driving apparatus with a novel structure that allows a bicycle to move forward by alternately pushing each of both pedals in one direction.

BACKGROUND ART

Generally, a driving apparatus provided in a bicycle, as shown in FIG. 1, includes a rotating shaft 1 provided in a frame, crank arms 2 and 3 provided on both end parts of the rotating shaft 1 to extend in opposite directions, pedals 4 and 5 provided on front end parts of the left and right crank arms 2 and 3, a drive sprocket 6 provided on the rotating shaft 1, a driven sprocket 7 provided on a rear wheel, and a chain 8 that connects the drive sprocket 6 and the driven sprocket 7. When a user riding the bicycle continuously rotates the left and right pedals 4 and 5 in one direction, the driven sprocket 7 and the rear wheel rotate in one direction so as to allow the bicycle to move forward.

However, since a user should pedal in a circle, the bicycle driving apparatus has a problem of inconvenience of use.

Therefore, a new method is required to solve the problem.

DISCLOSURE

Technical Problem

The present invention is directed to providing a bicycle driving apparatus with a novel structure that allows a bicycle to move forward by alternately pushing both pedals in one direction.

Technical Solution

One aspect of the present invention provides a bicycle driving apparatus which includes a support body (10) which has a first through hole (11) and a second through hole (12) formed on both sides thereof and is fixed to a frame of a bicycle, a rotation drum (20) which is rotatably provided in the support body (10) and includes an extension part (21) formed on one side thereof and extending outward from the support body (10) through the first through hole (11), an extension tube part (27) formed on the other side thereof and extending in a lateral direction, and a first screw thread (22) formed on an inner circumferential surface thereof, a rotating shaft (30) which extends in a lateral direction and has one end portion extending inward of the rotation drum (20) through the extension tube part (27) and the other end portion extending outward from the support body (10) through the second through hole (12), a planetary gear (40) which is rotatably coupled to a support shaft (13) provided in the support body (10) and extending in the lateral direction to be positioned in the rotation drum (20) and has a circumferential surface engaged with the first screw thread (22), a sun gear (50) fixedly coupled to the rotating shaft (30) to be positioned in the support body (10) and engaged with the planetary gear (40), a linkage shaft (60) provided outside a middle portion of the rotating shaft (30) to be positioned outside the rotation drum (20), operatively connected to the rotating shaft (30) and the extension tube part (27) through a first one-way bearing (71) and second one-way bearing (72), and having a second screw thread (61) formed on an outer circumferential surface thereof, a gearshift (80) rotatably coupled to the support shaft (13), which is provided to extend in the support body (10) in a lateral direction, and engaged with the second screw thread (61) of the linkage shaft (60), an output gear (90) which is rotatably coupled to a circumferential portion of the rotating shaft (30) and includes a third screw thread (91) formed on an outer circumferential surface thereof and engaged with the gearshift (80) and an extension part (92) having one portion extending outward from the support body (10) through the second through hole (12), a drive sprocket (100) rotatably coupled to the rotating shaft (30) to be positioned outside the support body (10) and connected to the output gear (90) through a clutch (101), and a left crank arm (111) and a right crank arm (112) which are provided on end portions of the rotating shaft (30) and the extension part (21) of the rotation drum (20) and include a left pedal and a right pedal provided on front end portions thereof.

The rotation drum (20) may include a ring gear (23) having the first screw thread (22) formed on an inner circumferential surface thereof, a first blocking plate (24) coupled to one side of the ring gear (23) and having the extension part (21) formed in a central portion thereof, and a second blocking plate (25) coupled to the other side of the ring gear (23) and having the extension tube part (27) formed in a central portion thereof, wherein the extension part (21) and the extension tube part (27) are provided to be positioned coaxially, and the planetary gear (40) includes a first gear (41) having a circumferential surface engaged with the first screw thread (22) and a second gear (42) having a smaller diameter than the first gear (41) and engaged with the sun gear (50).

A ratio of the first gear (41) to the second gear (42) may be formed to correspond to a ratio of a diameter of the first screw thread (22) to a diameter of the sun gear (50), and when the rotation drum (20) rotates, the sun gear (50) and the rotating shaft (30) may be driven by the same angle as a rotation angle of the rotation drum (20) in a direction opposite to the rotation of the rotation drum (20).

Through holes (26) having an arc-shape may be formed in the first and second blocking plate (24, 25) of the rotation drum (20) so that the support shaft (13) passes therethrough, and the rotation drum (20) may rotate within a predetermined angle range in a forward or reverse direction.

Advantageous Effects

Since a user repeatedly presses down a left pedal (113) and a right pedal (114) to move a bicycle forward, the bicycle driving apparatus according to the present invention has an advantage of more convenience of use than a conventional bicycle driving apparatus in which the left pedal (113) and the right pedal (114) should rotate.

DESCRIPTION OF DRAWINGS

FIG. 1 is a side view illustrating a conventional bicycle driving apparatus.

FIG. 2 is a side view illustrating a bicycle driving apparatus according to the present invention.

FIG. 3 is a cross-sectional view illustrating a cross-section taken along line A-A in FIG. 2.

FIG. 4 is a cross-sectional view illustrating a state in which a support body of the bicycle driving apparatus according to the present invention is removed.

FIG. 5 is an enlarged view illustrating main parts of the bicycle driving apparatus according to the present invention.

FIGS. 6 and 7 are side views illustrating a rotation drum of the bicycle driving apparatus according to the present invention.

FIG. 8 is an enlarged view illustrating main parts of the bicycle driving apparatus according to the present invention.

FIG. 9 is a lateral cross-sectional view illustrating a cross-section taken along line B-B in FIG. 8.

FIG. 10 is a lateral cross-sectional view illustrating a cross-section taken along line C-C in FIG. 8.

FIGS. 11 and 12 are cross-sectional views illustrating operation of the bicycle driving apparatus according to the present invention.

BEST MODES OF THE INVENTION

Hereinafter, the present invention will be described in detail with reference to the accompanying drawings.

FIGS. 2 to 12 illustrate a bicycle driving apparatus according to the present invention. The bicycle driving apparatus includes a support body 10, a rotation drum 20, a rotating shaft 30, a planetary gear 40, a sun gear 50, a linkage shaft 60, a gearshift 80, an output gear 90, and the drive sprocket 100, wherein the support body 10 has a first through hole 11 and a second through hole 12 formed in both surfaces thereof and is fixed to a frame, the rotation drum 20 is rotatably provided in the support body 10 and includes an extension part 21 formed on one side thereof to extend outward from the support body 10 through the first through hole 11, an extension tube part 27 formed on the other side thereof to extend in a lateral direction, and a first screw thread 22 formed on an inner circumferential surface thereof, the rotating shaft 30 extends in the lateral direction and has one end portion extending inward of the rotation drum 20 through the extension tube part 27 and the other end portion extending outward from the support body 10 through the second through hole 12, the planetary gear 40 is rotatably coupled to a support shaft 13 provided in the support body 10 and extending in the lateral direction to be positioned in the rotation drum 20 and has a circumferential surface engaged with the first screw thread 22, the sun gear 50 is fixedly coupled to the rotating shaft 30 to be positioned in the support body 10 and engaged with the planetary gear 40, the linkage shaft 60 is provided outside a middle portion of the rotating shaft 30 to be positioned outside the rotation drum 20, is operatively connected to the rotating shaft 30 and the extension tube part 27 through a first one-way bearing 71 and second one-way bearing 72, and has a second screw thread 61 formed on an outer circumferential surface thereof, the gearshift 80 is rotatably coupled to the support shaft 13 extending in the support body 10 in a lateral direction and engaged with the second screw thread 61 of the linkage shaft 60, the output gear 90 is rotatably coupled to a circumferential portion of the rotating shaft 30, has a third screw thread 91 formed on an outer circumferential surface thereof to be engaged with the gearshift 80, and has an extension part 92 formed on one side thereof to extend outward from the support body 10 through the second through hole 12, the drive sprocket 100 is rotatably coupled to the rotating shaft 30 to be positioned outside the support body and connected to the output gear 90 through a clutch 101, and left and right crank arms 111 and 112 which are provided on end portions of the rotating shaft 30 and the extension part 21 of the rotation drum 20 and have a left pedal 113 and a right pedal 114 provided on the front end portions thereof.

As shown in FIG. 3, the support body 10 is formed in a cylindrical shape that extends in a lateral direction.

The first through hole 11 is formed in a central portion of a left surface of the support body 10, and the second through hole 12 is formed in a central portion of a right surface of the support body 10.

The rotation drum 20 includes a ring gear 23 having a first screw thread 22 formed on an inner circumferential surface thereof, a first blocking plate 24 coupled to a left surface of the ring gear 23 and having the extension part 21 formed in the central portion thereof, and a second blocking plate 25 coupled to a right surface of the ring gear 23 and having the extension tube part 27 formed in a central portion thereof.

In this case, as shown in FIGS. 5 and 6, each of the first and second blocking plates 24 and 25 includes an arc-shaped through hole 26 through which the support shaft 13 passes, and the rotation drum 20 is provided to rotate within a predetermined angle range in a forward or reverse direction.

Further, the extension part 21 and the extension tube part 27 are positioned coaxially.

As shown in FIG. 5, the planetary gear 40 includes a first gear 41 having a circumferential surface engaged with the first screw thread 22 and a second gear 42 having a smaller diameter than the first gear 41 and engaged with the sun gear 50.

In this case, a ratio of the first gear 41 to the second gear 42 is formed to correspond to a ratio of a diameter of the first screw thread 22 to a diameter of the sun gear 50, and when the rotation drum 20 rotates, the sun gear 50 and the rotating shaft 30 rotate by the same angle as the rotation angle of the rotation drum 20 in a direction opposite to the rotation of the rotation drum 20.

The central portion of the support shaft 13 passes though the through hole 26 of the rotation drum 20, and the both end portions thereof are coupled to both end portions of the support body 10.

As shown in FIG. 8, an inner diameter of the linkage shaft 60 is greater than outer diameters of the extension tube part 27 of the rotation drum 20 and the rotating shaft 30, and the second screw thread 61 is formed on an outer circumferential surface of a right end of the linkage shaft 60.

As shown in FIGS. 9 and 10, each of the first and second one-way bearings 71 and 72 includes an inner wheel 73 fixedly coupled to an outer circumferential surface of the rotating shaft of the extension tube part 27, an outer wheel 74 rotatably coupled to an outer portion of the inner wheel 73 and fixedly coupled to an inner circumferential surface of the linkage shaft 60, and a fixing key 75 which is provided between the inner wheel 73 and the outer wheel 74 and selectively fixes the inner wheel 73 and the outer wheel 74 in a rotation direction of the inner wheel 73, wherein only when the inner wheel 73 rotates in a clockwise direction, the outer wheel 74 rotates in the clockwise direction.

To this end, an inclined groove 74a is formed in an inner circumferential surface of the outer wheel 74 and becomes concave in the counter-clockwise direction, and the fixing key 75 is formed in the form of a circular column extending in a lateral direction and installed to be inserted into the inclined groove 74a.

Therefore, the inner wheel 73 rotates in the counter-clockwise direction, the fixing key 75 moves to a deep position of the inclined groove 74a to decouple the inner wheel 73 from the outer wheel 74, and thus the inner wheel 73 idles.

On the contrary, when the inner wheel 73 rotates in the clockwise direction, the fixing key 75 moves to a low position of the inclined groove 74a to be inserted between the inner wheel 73 and the outer wheel 74, and thus the inner wheel 73 and the outer wheel 74 rotate in the clockwise direction.

Since one-way bearings are generally used, detailed description thereof will be omitted.

As shown in FIG. 8, the gearshift 80 includes a third gear 81 engaged with the second screw thread 61 and a fourth gear 82 having a greater diameter than the third gear 81 and engaged with the third screw thread 91 and is formed to transfer a driving force to the output gear 90 by increasing a rotation speed of the linkage shaft 60.

The drive sprocket 100 is connected to the driven sprocket 7, which is provided on the rear wheel of the bicycle, through the chain 8 coupled to a circumferential portion thereof.

Therefore, when the drive sprocket 100 rotates in the clockwise direction, the rear wheel of the bicycle rotates in the clockwise direction to allow the bicycle to move forward.

The clutch 101 is provided on the extension part 92 of the output gear 90 to be positioned outside the support body 10, and when a user operates an adjusting unit, which is not shown, the output gear 90 and the drive sprocket 100 are connected to or disconnected from each other.

Since various types of the clutch 101 are developed and used, the detailed descriptions will be omitted.

The left and right crank arms 111 and 112 are provided to extend forward from end portions of the rotating shaft 30 and the extension part 21 of the rotation drum 20, and a user alternately presses down the left and right pedals 113 and 114, and thus the left and right crank arms 111 and 112, the rotation drum 20, and the rotating shaft 30 alternately rotate in a clockwise direction.

Operation of the bicycle driving apparatus will be described with reference to the drawings.

In this case, a portion indicated by a solid arrow in the drawings represents a portion that rotates in the clockwise direction, and a portion indicated by a dotted arrow represents a portion that rotates in the counter-clockwise direction.

First, as shown in FIG. 3, in a state in which the left crank arm 111 rotates downward and the right crank arm 112 rotates upward, as shown in FIG. 11, when a user presses the right pedal 114 down to rotate the right crank arm 112 in the clockwise direction, the rotating shaft 30 rotates in the clockwise direction, a driving force of the rotating shaft 30 is transferred to the linkage shaft 60 through the second one-way bearing 72 so that the linkage shaft 60 rotates in the clockwise direction, and thus the gearshift 80 rotates in the counter-clockwise direction, the output gear 90 rotates in the clockwise direction, and the drive sprocket 100 rotates in the clockwise direction.

When the rotating shaft 30 rotates in the clockwise direction, the sun gear 50 rotates in the clockwise direction, and the planetary gear 40 rotates in the counter-clockwise direction, and thus, the rotation drum 20 and the left crank arm 111 rotate in the counter-clockwise direction, that is, in an upward direction.

Further, in a state in which the left crank arm 111 rotates upward and the right crank arm 112 rotates downward, as shown in FIG. 12, when a user presses the left pedal 113 down to rotate the left crank arm 111 in the clockwise direction, the rotation drum 20 rotates in the clockwise direction so that a driving force of the rotation drum 20 is transferred to the linkage shaft 60 through the first one-way bearing 71, and the linkage shaft 60 rotates in the clockwise direction, and thus the gearshift 80 rotates in the counter-clockwise direction, the output gear 90 rotates in the clockwise direction, and the drive sprocket 100 rotates in the clockwise direction.

When the rotation drum 20 rotates in the clockwise direction, the planetary gear 40 rotates in the clockwise direction, and the sun gear 50 rotates in the counter-clockwise direction, and therefore, the rotating shaft 30 and the right crank arm 112 rotate in the counter-clockwise direction, that is, in an upward direction. That is, when a user presses the left pedal 113 down, the right pedal 114 moves upward, and the drive sprocket 100 rotates in the clockwise direction. When the user presses the right pedal 114 down, the left pedal 113 moves upward, and the drive sprocket 100 rotates in the clockwise direction.

Therefore, when the user alternately presses down the left pedal 113 and the right pedal 114, the drive sprocket 100 continuously rotates in the clockwise direction, and thus the bicycle moves forward.

When a user repeatedly presses down the left pedal 113 and the right pedal 114, a bicycle is moved forward only by rotation by an angle of 120° instead of 360°, and thus the bicycle driving apparatus configured as described above has an advantage of more convenience of use than a conventional bicycle driving apparatus in which the left pedal 113 and the right pedal 114 should rotate.

Specifically, in the case of general bicycles, a right crank arm and a drive sprocket are integrated, but in the case of the bicycle according to the present invention, the drive sprocket 100 and the right crank arm 112 are separated so as to be driven separately.

MODES OF THE INVENTION

Embodiments for the invention have been described above in the best modes for the invention.

INDUSTRIAL APPLICABILITY

The present invention relates to a bicycle driving apparatus that is applicable to bicycles and repeatedly usable, thereby having industrial applicability.

The invention claimed is:
1. A bicycle driving apparatus comprising:
a support body (10) which has a first through hole (11) and a second through hole (12) formed in both sides thereof and is fixed to a frame of a bicycle;
a rotation drum (20) which is rotatably provided in the support body (10) and includes an extension part (21) formed on one side thereof and extending outward from the support body (10) through the first through hole (11), an extension tube part (27) formed on the other side thereof and extending in a lateral direction, and a first screw thread (22) formed on an inner circumferential surface thereof;
a rotating shaft (30) which extends in a lateral direction and has one end portion extending inward of the rotation drum (20) through the extension tube part (27)

and the other end portion extending outward from the support body (10) through the second through hole (12);

a planetary gear (40) which is rotatably coupled to a support shaft (13) provided in the support body (10) and extending in the lateral direction to be positioned in the rotation drum (20) and has a circumferential surface engaged with the first screw thread (22);

a sun gear (50) fixedly coupled to the rotating shaft (30) to be positioned in the support body (10) and engaged with the planetary gear (40);

a linkage shaft (60) provided outside a middle portion of the rotating shaft (30) to be positioned outside the rotation drum (20), operatively connected to the rotating shaft (30) and the extension tube part (27) through a first one-way bearing (71) and a second one-way bearing (72), and having a second screw thread (61) formed on an outer circumferential surface thereof;

a gearshift (80) rotatably coupled to the support shaft (13), which is provided to extend in the support body (10) in a lateral direction, and engaged with the second screw thread (61) of the linkage shaft (60);

an output gear (90) which is rotatably coupled to a circumferential portion of the rotating shaft (30) and includes a third screw thread (91) formed on an outer circumferential surface thereof and engaged with the gearshift (80) and an extension part (92) having one portion extending outward from the support body (10) through the second through hole (12);

a drive sprocket (100) rotatably coupled to the rotating shaft (30) to be positioned outside the support body (10) and connected to the output gear (90) through a clutch (101); and a left crank arm (111) and a right crank arm (112) which are provided on end portions of the rotating shaft (30) and the extension part (21) of the rotation drum (20) and include a left pedal (13) and a right pedal (114) provided on front end portions thereof.

2. The bicycle driving apparatus of claim 1, wherein the rotation drum (20) includes:

a ring gear (23) having the first screw thread (22) formed on an inner circumferential surface thereof;

a first blocking plate (24) coupled to one side of the ring gear (23) and having the extension part (21) formed in a central portion thereof; and a second blocking plate (25) coupled to the other side of the ring gear (23) and having the extension tube part (27) formed in a central portion thereof, wherein the extension part (21) and the extension tube part (27) are provided to be positioned coaxially, and the planetary gear (40) includes a first gear (41) having a circumferential surface engaged with the first screw thread (22) and a second gear (42) having a smaller diameter than the first gear (41) and engaged with the sun gear (50).

3. The bicycle driving apparatus of claim 2, wherein a ratio of the first gear (41) to the second gear (42) is formed to correspond to a ratio of a diameter of the first screw thread (22) to a diameter of the sun gear (50), and when the rotation drum (20) rotates, the sun gear (50) and the rotating shaft (30) are driven by the same angle as a rotation angle of the rotation drum (20) in a direction opposite to the rotation of the rotation drum (20).

4. The bicycle driving apparatus of claim 2, wherein through holes (26) having an arc-shape are formed in the first and second blocking plate (24, 25) of the rotation drum (20) so that the support shaft (13) passes therethrough, and the rotation drum (20) rotates within a predetermined angle range in a forward or reverse direction.

* * * * *